US008219221B2

(12) United States Patent
Schultz et al.

(10) Patent No.: US 8,219,221 B2
(45) Date of Patent: Jul. 10, 2012

(54) INDUSTRIAL CONTROLLER USING SHARED MEMORY MULTICORE ARCHITECTURE

(75) Inventors: Ronald E. Schultz, Solon, OH (US); Scot A. Tutkovics, Aurora, OH (US); Richard J. Grgic, Painesville, OH (US); James J. Kay, Chardon, OH (US); James W. Kenst, Richmond Heights, OH (US); Daniel W. Clark, Mayfield Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 541 days.

(21) Appl. No.: 12/432,427

(22) Filed: Apr. 29, 2009

(65) Prior Publication Data

US 2009/0210069 A1 Aug. 20, 2009

Related U.S. Application Data

(63) Continuation of application No. 12/270,502, filed on Nov. 13, 2008.

(60) Provisional application No. 60/987,615, filed on Nov. 13, 2007.

(51) Int. Cl.
G06F 19/00 (2011.01)

(52) U.S. Cl. .......................................... 700/79; 711/103
(58) Field of Classification Search .................. 700/2, 5, 700/7, 19, 23, 79; 711/103, 130, 147, 154, 711/125; 713/324, 501
See application file for complete search history.

(56) References Cited

U.S. PATENT DOCUMENTS

| 5,068,778 | A | * | 11/1991 | Kosem et al. | 700/9 |
| 5,848,283 | A | * | 12/1998 | Moore et al. | 712/40 |
| 6,779,128 | B1 | * | 8/2004 | Gale et al. | 714/6.12 |
| 7,853,755 | B1 | * | 12/2010 | Agarwal et al. | 711/141 |
| 2002/0138698 | A1 | * | 9/2002 | Kalla | 711/130 |
| 2002/0184445 | A1 | * | 12/2002 | Cherabuddi | 711/130 |
| 2003/0009629 | A1 | * | 1/2003 | Gruner et al. | 711/130 |

* cited by examiner

*Primary Examiner* — Kidest Bahta
(74) *Attorney, Agent, or Firm* — Boyle Fredrickson, S.C.; R. Scott Speroff; John M. Miller

(57) ABSTRACT

A multicore processor for industrial control provides for the execution of separate operating systems on the cores under control of one of the cores to tailor the operating system to optimum execution of different applications of industrial control and communication. One core may provide for a reduced instruction set for execution of industrial control programs with the remaining cores providing a general-purpose instruction set.

20 Claims, 6 Drawing Sheets

INDUSTRIAL CONTROLLER USING SHARED MEMORY MULTICORE ARCHITECTURE

CROSS-REFERENCE TO RELATED APPLICATIONS

This application claims the benefit of U.S. provisional application 60/987,615 filed Nov. 13, 2007 and hereby incorporated by reference and is a continuation of U.S. application Ser. No. 12/270,502 filed Nov. 13, 2008 also hereby incorporated by reference.

BACKGROUND OF THE INVENTION

The present invention relates generally to industrial controllers for controlling industrial processes or machinery, and in particular to a shared memory architecture for a processor used for such an industrial controller Industrial controllers are special purpose computers used for controlling factory automation and the like. Under the direction of stored programs, a processor of the industrial controller examines a series of inputs reflecting the status of a controlled process and changes outputs affecting control of the controlled process. The stored control programs may be continuously executed in a series of execution cycles, repeated periodically, or executed based on events.

Industrial controllers differ from standard computers in several important ways. First, the control program executed by the industrial controller is normally highly customized to a particular control application. For this reason, special control languages, such as "relay ladder logic" are normally used to facilitate programming of the device.

Second, industrial controllers may adopt a modular architecture allowing components, such as I/O modules, to be freely added or removed. Further, predictable high-speed execution of the instructions must be ensured for reliable real-time control and, unlike standard computers which may tolerate occasional crashes and restarts, industrial controllers must be designed for maximum availability commensurate with the high costs of stopping and starting industrial processes such as assembly lines. For these reasons, industrial controllers often use a proprietary operating system dedicated to industrial control and may use special-purpose processors.

Increasingly, industrial controllers are being called upon to perform tasks normally associated with standard computers including, for example, network communications using Ethernet, DeviceNet or similar standard data transmission protocols. In order to take advantage of the rapid advances in network communications associated with standard computers, designers have constructed industrial controllers that work closely with standard processors communicating over high-speed dedicated network links. In these cases, for example, communication applications may be executed by the standard processor using commercially available packages and the data communicated to the industrial controller over a network or backplane.

Such dual-computer systems can substantially increase the complexity of programming the system and make it difficult to provide a reliable and available industrial control. In particular, the industrial controller can now be disabled by a fault condition in either processor. Automatic initialization and restarting of the system under such fault conditions is complex and may require that the system the taken off-line for a period of time. Communication between the two computers, even on high-speed networks, can form a barrier to complete flexibility in allocations of processing tasks between the two machines.

SUMMARY OF THE INVENTION

The present invention provides an industrial controller using a multicore processor executing different operating systems, one for industrial control, one for general purpose computing, according to specialized application programs that will be executed by the processor. The processors communicate by exchanging data through shared memory for extremely close integration and high-speed communication.

Specifically, the present invention provides an industrial controller using a multicore electronic computer having a first and second processor, each processor having a respective memory cache and sharing electronic memory communicating with the first and second processors through their memory caches, the electronic memory holding a first and second operating system. A startup sequence circuit responds to a startup signal to: (a) load the first operating system onto the first processor, (b) load the second operating system onto the second processor, (c) assign application programs to the first processor and to the second processor based on the characteristics of the first and second operating systems, and (d) communicate between the application programs on the first and second data by exchange data using shared space in the electronic memory.

It is thus one feature of at least one embodiment of the invention to provide an industrial controller that may automatically load multiple operating systems to permit matching of the operating system to the different application programs required for modern industrial control.

The application programs on the first processor may execute industrial control logic for controlling a machine in real-time by reading input signals from sensors on the machine to provide output signals to actuators on the machine according to control logic, and wherein the application programs on the second processor may execute communication protocols for asynchronous communications networks. The communication protocols may be, for example Ethernet or USB communication protocols.

It is thus a feature of at least one embodiment of the invention to permit the close integration of commercial communication programs into an industrial controller without jeopardizing the high reliability of the industrial controller or its high-availability.

The first processor may include a general-purpose core and a RISC core, the latter having a reduced instruction set of industrial control instructions, and the startup sequence circuit assigns industrial control programs to the first processor.

It is thus a feature of at least one embodiment of the invention to provide an industrial controller providing a dedicated industrial control core within a multicore architecture.

The second operating system is selected from the group consisting of Linux and Windows embedded or real-time operating systems.

It is thus a feature of at least one embodiment of the invention to permit close integration of widely disseminated operating systems, and to provide access to the economies of scale associated with such operating systems without jeopardizing availability or reliability of real-time control.

The startup sequence circuit may assign application programs to the first and second processors by controlling memory spaces of the processors and placing the application programs in those memory spaces.

It is thus a feature of at least one embodiment of the invention to provide a flexible method of assigning application programs to particular operating systems and cores. It is a further feature of at least one embodiment of the invention to reduce the chance of errors in one processor from corrupting the operation of the other processor.

The startup sequence circuit may deliberately limit the ability of the second processor to modify its memory access and interrupts.

It is thus a feature of at least one embodiment of the invention to provide a method of employing a shared memory architecture with standard operating systems without reducing the availability of the industrial controller caused by memory corruption from the standard operating system.

The first processor may include a general-purpose core and a RISC core and a cache manager circuit may be provided routing access of the data of the I/O table by the general-purpose core through a cache of the RISC core, whereby invalidation of the cache of the RISC core is minimized.

It is thus a feature of at least one embodiment of the invention to employ a shared memory architecture without reducing high-speed RISC performance as a result of cache protocol overhead needed for shared memory operation.

The startup sequence circuit may hold the second processor in reset during an initialization of the multicore processor by the first processor executing a startup program.

It is thus a feature of at least one embodiment of the invention to automatically load multiple operating systems invisibly in a reliable and predictable fashion.

The first processor may provide signals to the second processor according to an executed application program on the first processor, whereby the signals can shut down, reset, and restart the second processor.

It is thus a feature of at least one embodiment of the invention to provide a control asymmetry to the cores, minimizing the risk of loss of availability from faulting by a core running lower priority processes.

The invention may include a power backup system providing a signal to the first processor indicating use of backup power and triggering an application program to shut down the second processor.

It is thus a feature of at least one embodiment of the invention to provide for a so-called "hot swap" operation in which the multicore device may be removed and replaced during operation of the industrial controller The electronic memory may include a first memory portion used only by the first processor, a second portion used only by the second processor, and a third portion shared by the first and second processors, and the electronic memory may hold hardware drivers having executable instructions duplicated in each of the first and second portions but operating on data contained in the third portion to communicate between either the first processor or the second processor and a hardware component.

It is thus a feature of at least one embodiment of the invention to provide a practical mechanism for shared drivers in a multicore system for driver intensive industrial control.

The industrial controller may further include a system clock providing a 1 μs accuracy time value and a first and second comparator receiving the time value and receiving from the first processor and second processor respectively a time trigger value for providing a triggering signal to the respective first or second processor based on the time value.

It is thus a feature of at least one embodiment of the invention to provide a high precision accumulating clock that may be used by the two processors for synchronization of activities between the processors necessary for industrial control.

The system clock maybe synchronized to clocks on a network in remote devices using the IEEE 1558 standard.

It is thus a feature of at least one embodiment of the invention to provide close integration between an on-chip clock and external network clocks.

The first and second processors may provide instruction decoders interpreting instructions associated with network communication between a first and second processor as inter-core communication on the multicore processor using shared memory.

It is thus a feature of at least one embodiment of the invention to provide a novel technique for seamless migration of pre-existing software into the architecture of the present invention.

These particular objects and advantages may apply to only some embodiments falling within the claims and thus do not define the scope of the invention.

DETAILED DESCRIPTION OF THE PREFERRED EMBODIMENT

Figure 1:
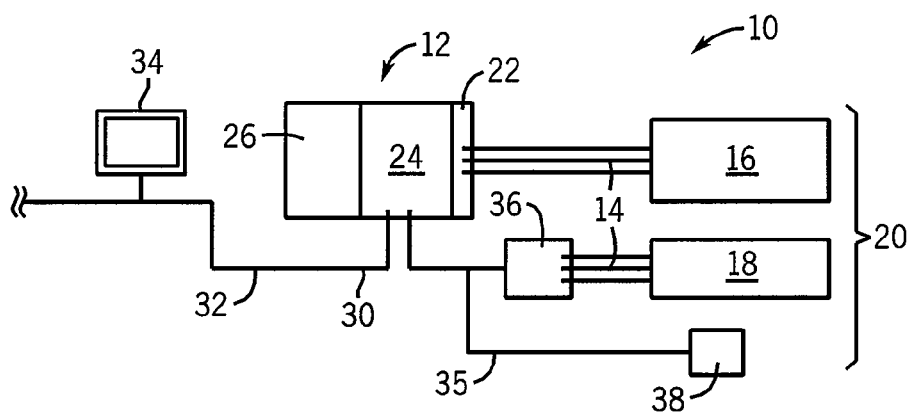
FIG. 1 is a block diagram of an industrial control system suitable for use with the industrial controller using processor architecture of the present invention.

Referring now to FIG. 1, an industrial control system 10 incorporating the present invention may provide for an industrial controller 12 communicating via multiple I/O lines 14 with machines 16 and 18 of an industrial process 20. As is understood in the art, the I/O lines 14 may connect directly from I/O card 22 in the industrial controller 12 communicating via a backplane 49 with an internal processor 24 (discussed with respect to FIG. 2). The industrial controller 12 may also include a power supply 26 providing power to the I/O card 22 and processor 24.

The industrial controller 12 may also provide connections for one or more standard network connections 30, for example including an Ethernet or USB connection 32 communicating with remote devices 34 such as human machine interfaces, standard desktop computers, mainframes, and the Internet. The industrial controller 12 may also provide connections for one or more specialized industrial control networks, for example, ControlNet, DeviceNet or EthernetIP communicating with remote I/O modules 36 or individual actuators or sensors 38, in turn communicating with equipment or machines of the industrial process 20.

Figure 2:
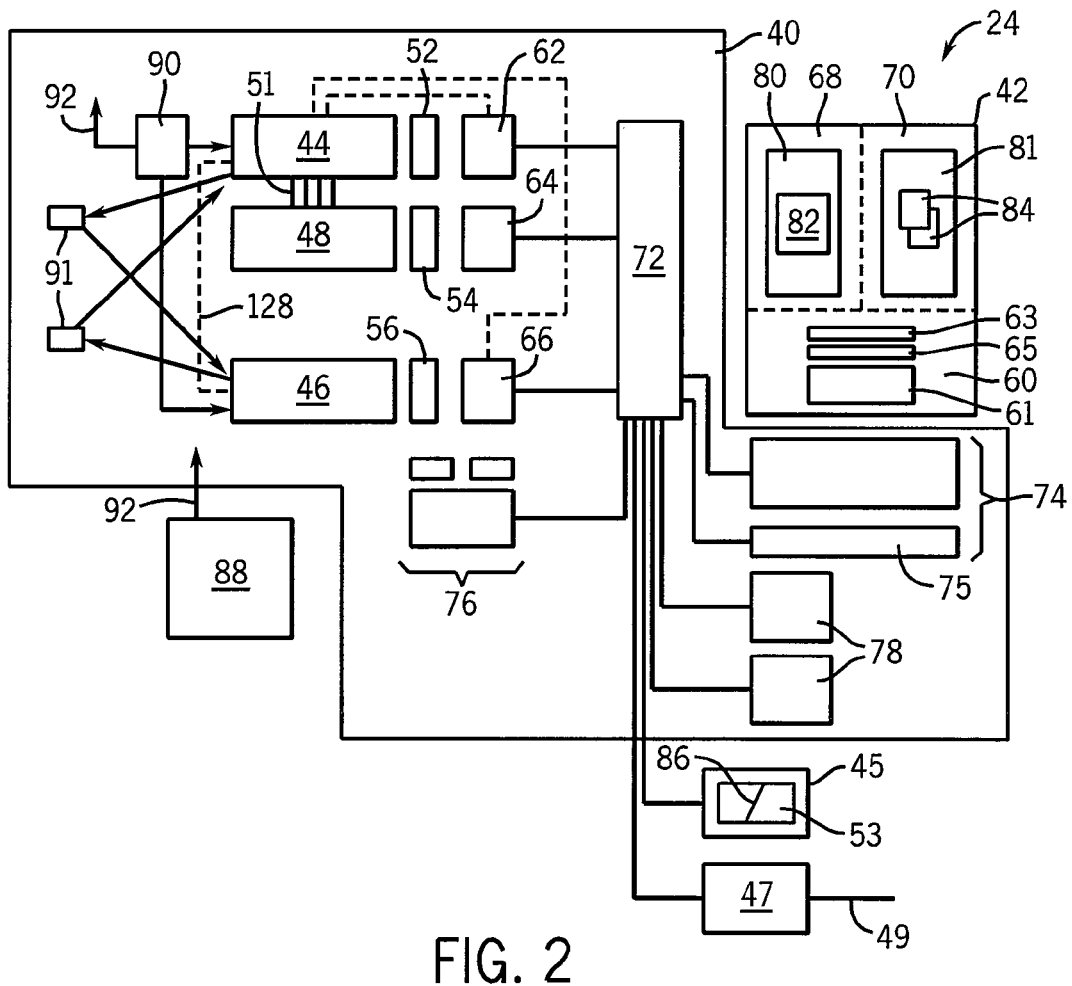
FIG. 2 is a block diagram of the multicore processor architecture of the industrial controller of FIG. 1.

Referring now to FIG. 2, the industrial controller 12 may include a multicore processor 40 having multiple processing cores 44, 48, and 46 communicating with a main memory 42 and a non-volatile memory 45. The main memory 42 and non-volatile memory 45 are typically, but need not be, physically separate devices from a multicore processor 40, the latter of which is preferably implemented on a single integrated circuit.

In a preferred embodiment of the present invention, the multicore processor 40 includes two general-purpose cores 44 and 46 and a specialized reduced instruction set (RISC) core 48, the latter optimized for the execution of industrial control instructions such as relay ladder logic instructions known in the art. The main core 44 and the RISC core 48 may provide for intercommunications using a coprocessor interface 51 but each may have a separate L1 cache 52 and 54 respectively. The auxiliary core 46 does not connect directly with the RISC core 48 and has an L1 cache 56. The caches 52, 54 and 56, as is understood in the art, allow rapid access to the memory 42 through standard cache coherence protocols for shared memory architectures, modified as will be described below. Having separate caches 52 and 54 for the cores 44 and 48 together with the coprocessor interface 51 allows the cores 44 and 48 to run concurrently and allows the core 44 to run and handle interrupts while core 48 is concurrently executing a control program significantly enhancing performance.

The coprocessor interface 51, in this case, shares similarities with standard coprocessor interfaces which allow core 44 to issue an instruction requesting coprocessor activity from RISC core 48 and to wait until the completion of that activity. Typically the coprocessor activity is the execution of relay ladder code and may continue indefinitely during the control process. In the present invention, the core 44 may issue this coprocessor instruction and yet still remain susceptible to interrupts, providing better utilization of core 44.

In most cases, upon conclusion of servicing of the interrupts, the core 44 will return to waiting for completion of the coprocessor instruction, however the coprocessor interface 51 also allows the core 44 to instruct the RISC core 48 to stop operation before completion of the coprocessor instruction (after completion of a current instruction and emptying its write buffer) permitting the core 44 to then save the registers of the RISC core 48 and to reset the registers of the RISC core 48, in particular the program counter, so that the RISC core 48 undertakes the execution of a new relay ladder program. The effect is to allow task switching by the RISC core 48.

Upon completion of this second relay ladder program, the RISC core 48 responds to the core 44 and the core 44 may reinstate the previous register values of the RISC core 48 and the RISC core 48 may resume execution of its previous ladder logic as of the time of the interruption. This ability to stop the coprocessor activity of the RISC core 48, also permits the core 44 to access memory space exclusive to the RISC core 48 through the cache 54, during an interruption or suspension of the operation of the RISC core 48.

Each of the cores 44, 48 and 46 are also associated with a memory management unit 62, 64 and 66 operating to map a virtual memory address space to actual addresses in the memory 42 and providing for exclusive memory portions 68 and 70 for each of the cores 44, 48 and 46, and a mutual memory portion 60 that may be accessed by all cores and that provides for communication between cores as will he described.

Communication between the each core 44, 48, and 46 and memory 42 (via the caches 52, 54 and 56 and memory management units 62, 64, and 66) occurs via a bus 72. Bus 72 further provides a common communication path with non-volatile memory 45, interrupt circuitry 74, synchronization clock circuitry 76, hardware devices 78, and a bridge circuit 47 to a backplane 49 of the industrial controller 12. The hardware devices 78 may, for example, include network interface chips or USB devices or the like.

Memory 42 may hold two different operating systems: the first being a proprietary controller operating system 80 executing control logic application programs 82 and positioned in memory portion 68, and the second being a general purpose operating system 81, for example Windows or Linux, executing standard application programs 84 such as communication stacks or the like and positioned in memory portion 70. The mutual memory portions 60 of memory 42 may also contain an I/O table 61, common driver data 63 and interprocessor communication area 65 as will be described below.

As is generally understood in the art, an I/O table 61 holds data values exchanged with the industrial process 20. In a typical controller operation, during each loop through the control program 82, the contents of the I/O table 61 are held constant to be refreshed immediately prior to the next loop execution. In this way condition races are avoided and more predictable control operation can be obtained. Memory 42 is typically volatile dynamic memory having error correction codes.

Non-volatile memory 45 may hold an executive program 85 used to initialize operation of the industrial controller 12, for example, after a power loss. Non-volatile memory 45 may also be used to save critical operation data 53 in the event of power loss as will be described.

The industrial controller 12 may also include power processing circuit 88 providing regulated voltages to the multi-core processor 40 and short-term energy storage, for example, using batteries or capacitors. This energy storage can provide power to the multicore processor 40 sufficient to allow orderly shutdown in the event of power loss, for example, as can happen when there is a disconnecting of processor 24 from the backplane in a so-called "hot swap" transaction.

A power monitoring circuit 90 on the multicore processor 40 communicates with the power processing circuit 88 by means of power line signal 92 to coordinate powering down of the multicore processor 40 in the event of power loss. It will be understood that the division of functions between the on-chip monitoring circuit 90 and the offboard power processing circuit 88 may be flexibly reallocated. The power monitoring circuit 90 together with the executive executed by the first core 44 including routines at appropriate interrupt vectors of the cores 44 and 46, together operate to provide a "startup sequence circuit" as will be described below. This startup sequence circuit controls initialization of the dual operating systems on the two cores 44 and 46, and provides a processing asymmetry giving dominance to core 44 with respect to controlling core 46 with respect to reset and run signals, memory access, and interrupt access, as will be described below. Watchdog timers 91 are provided in the multicore processor 40, one associated with each of the general-purpose cores 44 and 46.

Generally all of the components of FIG. 2 may be contained on a single printed circuit board and the components of the multicore processor 40 all contained in a single integrated circuit.

Figure 3:
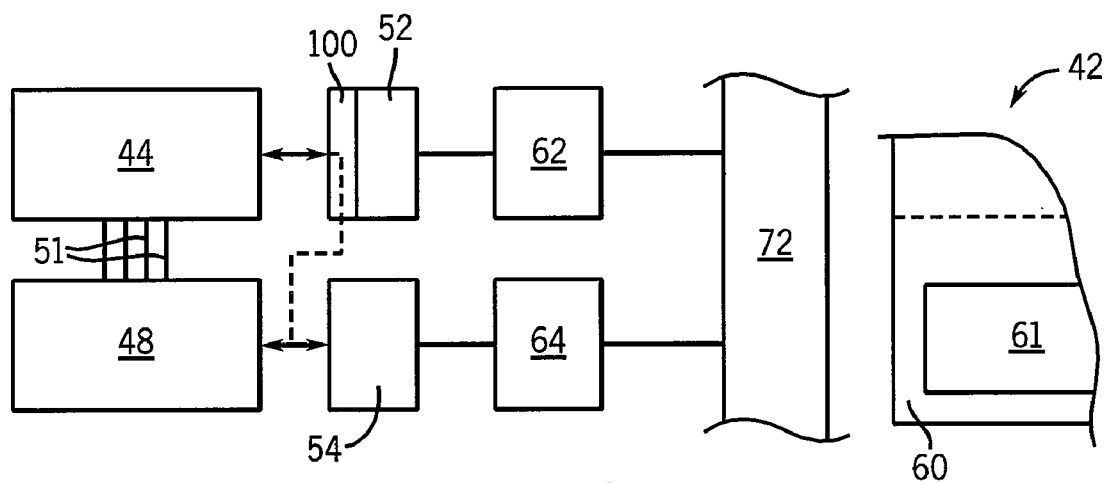
FIG. 3 is a detailed block diagram of the multiple cores of the multicore processor FIG. 2 showing cache redirection used to increase the speed of the RISC core of the present invention.

Referring now to FIGS. 2 and 3, as is understood generally in the art, caches 52 and 54 provide faster access to data of the memory 42 by the cores 44, 48 and 46 by "pre-fetching" blocks of data from the memory 42 to be held in the caches 52 and 54. This pre-fetched data is accessed directly by the cores 44 and 48, avoiding the delay associated with communication through the bus 72 with the slower dynamic RAM of memory 42. In a shared memory computer, as described, these cache accesses must be coordinated to prevent, for example, one core 44 from reading a value to its cache 52 that was written to cache 54 by the second core 48 moments before and before the caches are synchronized. Standard techniques of cache coordination (for example of those which allow for cache block invalidation) are provided to avoid this problem. Using these protocols, a value written to any one cache, invalidates the corresponding blocks of the other caches through the communication of cache protocol messages.

In the environment of high-speed industrial control, the cache invalidation process can interfere with the speed of execution of the RISC core 48 by frequently invalidating its cache blocks. In particular, this can occur when the core 44 is reading the I/O table 61 causing an invalidation of the corresponding cache block in cache 54, in turn requiring that cache 54 be refreshed, which is a time-consuming operation.

Figure 4:
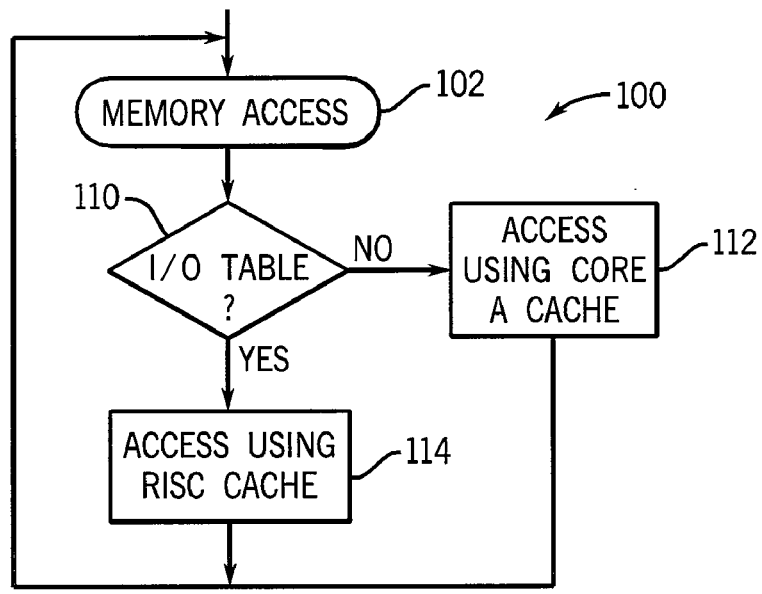
FIG. 4 is a flow chart showing the operation of the cache redirection of FIG. 3.

Accordingly, and referring now to FIGS. 3 and 4, in the present invention cache steering circuit 100 is implemented logically between core 44 and cache 52. This cache steering circuit 100 implements a check of each memory access by core 44, triggered by either reading or writing, as indicated by process block 102. As indicated by decision block 110, the cache steering circuit 100 determines whether the memory access would occur in the address range of the I/O table 61. This address range is set during the initialization of the multicore processor 40 as will be described below. In the preferred embodiment, the steering circuit 100 is implemented by the bus 72 by means of an address bit that, if not set, routes a memory request from core 44 back to cache 54 of core 48. For these accesses, cache 52 of core 44 is disabled and bypassed. This approach allows the rerouting without design access to the core and its cache.

If the memory access does not involve the address range of the I/O table 61, then at process block 112, access is performed through cache 52 normally associated with core 44. This means either that the data is taken from cache 52 from a pre-fetch, a new cache fetch is initiated or data is written to cache 52 and a cache invalidation of other caches occurs according to standard cache protocols.

If at decision block 110, a the access falls within the memory range of the I/O table 61, then at process block 114 the request is steered instead through cache 54 of the RISC core 48. While this indirection is not as fast as using cache 52, it prevents core 44 from invalidating a cache block of cache 54 associated with the memory range of I/O table 61, thus streamlining performance of the RISC core 48 when this data must be accessed by RISC core 48. The steering of the request through cache 54 means that cache 54 treats the request in all respects as if it was from the RISC core 48.

Figure 5:
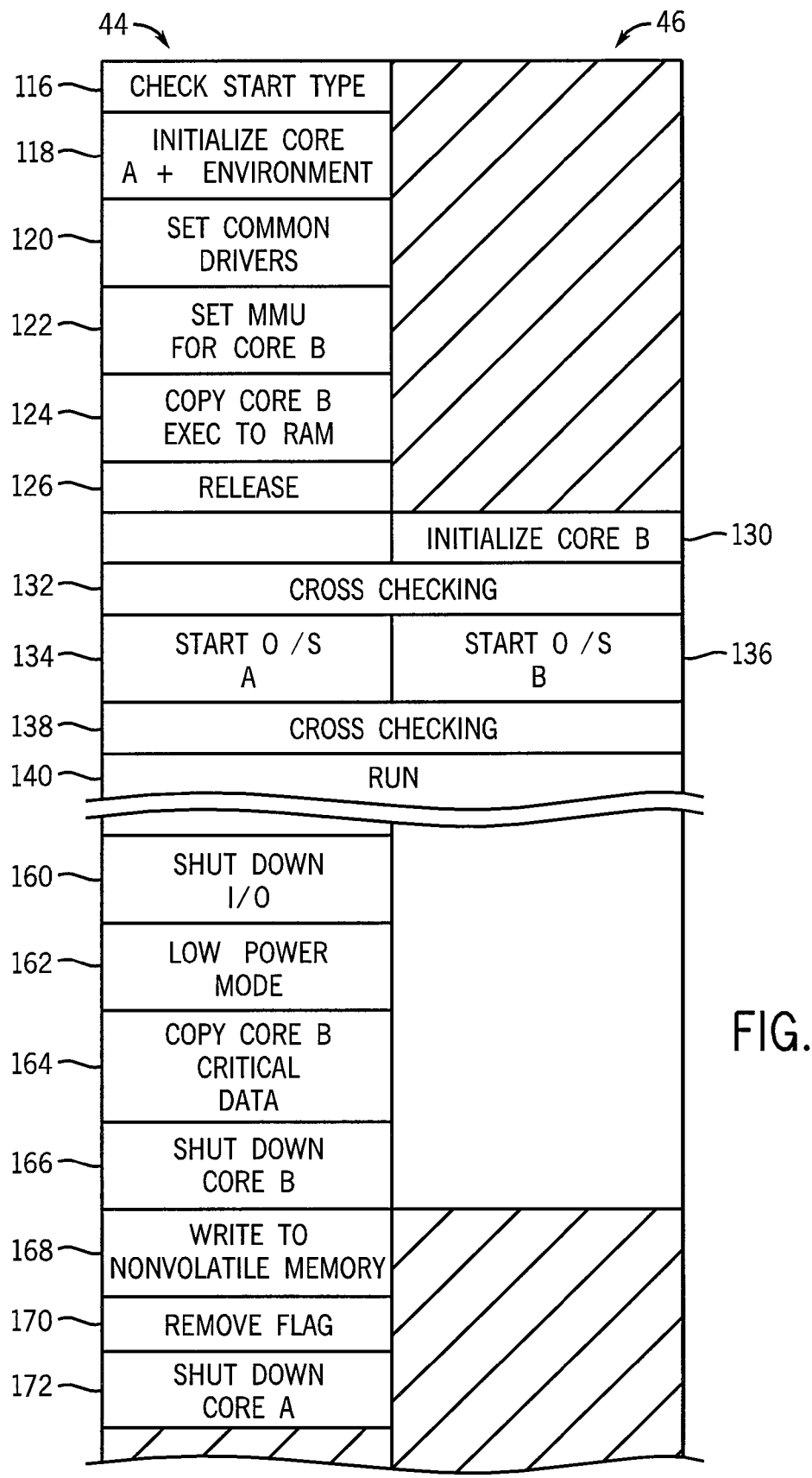
FIG. 5 is a timeline showing operation of a startup circuit in executing tasks on the different cores of the multicore architecture during a standard boot up and upon a power down, for example, occurring during a "hot swap"

Referring now to FIGS. 2 and 5, importantly, the multicore processor 40 is configured for automatic boot up of the two different operating systems 80 and 81, one on each of the cores 44 and 46, without user involvement. This is effected through the power monitoring circuit 90 which, upon receiving a power up signal through power line signal 92 or a reset signal (not shown), holds core 46 in reset while releasing core 44 to begin execution of an executive program at a startup vector. In a preferred embodiment, the boot program provides for the identification of a non-volatile memory 45 to load an executive program 86.

As shown in FIG. 5, in a first step of this executive program 85, indicated by process block 116, the core 44 determines the start mode that is occurring and, in particular, whether this is a "cold" start in which the entire processor 24 has been shut down in normal course, a "fault" start from a faulting of core 44, or a "hot" start resulting from a power loss induced shutdown. The start type may be obtained by means of a flag set in a start register (not shown) readable by core 44.

In this example of a cold start, upon the occurrence of a power up signal, the core 44 will determine the type of start at process block 116 and, determining that this is a cold start, will proceed to process block 118 to load an executive program 85 from the non-volatile memory 45 for initialization of the system. This executive program 85 provides for the remaining steps to be executed by the core 44 before loading of an operating system, and also loads interrupt service vectors for execution by the core 44 during certain types of shutdowns during a loss of power or other fault condition as will be described below.

Upon completion of the initialization of the core 44 and the operating environment of the multicore processor 40 per process block 118, according to techniques generally known in the art, the core 44 will set up common drivers as indicated by process block 120 and as will be described below.

At succeeding block 122, the core 44 sets the memory management units 62, 64, and 66 for the other cores 48 and 46. In a preferred embodiment, only core 44 can make changes in the memory management unit 66 for the core 46, however core 46 may request changes through core 44 through the interprocessor communication channel 75 as will be described. At this time the core 44 may define the partitioning that creates exclusive memory spaces 68 and 70 and mutual memory portions 60 such that the exclusive memory portion 68 may only be accessed by core 44, exclusive memory portion 70 may only be accessed by core 46, but mutual memory portion 60 may be accessed by cores 44, 46, or 48. At this time the address range of the I/O table 61 may be defined and provided to the cache steering circuit 100.

At process block 124, still executing the executive program 85, the core 44 may load an executive program for core 46 into memory 42. In this way, core 46 need not have access to non-volatile memory 45 simplifying the programming of the interface during initial startup procedures.

At process block 126, the core 44 releases core 46 via the power monitoring circuit 90. As noted above, core 44 has the ability to control the operating state of core 46 through software instructions as indicated by control line 128, for example by setting or resetting run/stop/reset lines of a type or known in the art.

After being released, core 46 jumps to its pre-loaded executive as indicated by process block 130 for its own initialization.

At process block 132 both cores 44 and 46 attempt a first cross communication through interprocessor communication area 65 contained in memory 42 in the mutual memory portion 60. This tests the low level communication protocols using interrupts on interprocessor communication channel 75.

If any of these checks fails, a fault is thrown and initialization is aborted with an appropriate indicator signal being provided to the user, for example, through front panel lights or the like (not shown).

If the cross-checked communication of process block 132 is successful, then each processor loads its operating system 80 or 81 as indicated by process blocks 134 and 136. As noted above, the operating system of core 44 will typically be a proprietary industrial control operating system such, as for example the Logix operating system manufactured by Rockwell Automation Technologies Inc. of Milwaukee, Wis. The operating system of core 46 may be a standard operating systems such as Windows or Linux or another RTOS. The dominance of core 44 over core 46 in the start up process, control of memory access, and interrupt operation permits the informally characterized operating system of core 46 to coexist in the environment of high reliability industrial control. In particular, programs executed by core 46 using operating system 81 have limited access to memory via the settings of MMU 66 and core 44 can reset the core 46 under certain detected circumstances including improper memory access.

It should be noted that although the operating system 80 is preferably selected to optimize control tasks, operating system 81 may also be used to execute control tasks at certain times in tandem with operating system 80, for example, when communications are not critical, thereby providing effective utilization of the cores 44 and 46. In such cases, the operating system 81 may be, for example, be a real-time operating system (RTOS) such as VxWorks from Wind River in Alameda California USA.

At the conclusion of the starting of the operating systems, the cores 44 and 46 execute a second cross check routine indicated by process block 138 which checks for communication between the processors using the interprocessor communication area 65 under operating system control. If all these checks are completed, then at process block 140 normal operation of the industrial control and the operating systems load respective application programs 82 and 84 in the memory portions 68 and 70 using normal loader routines.

Figure 6:
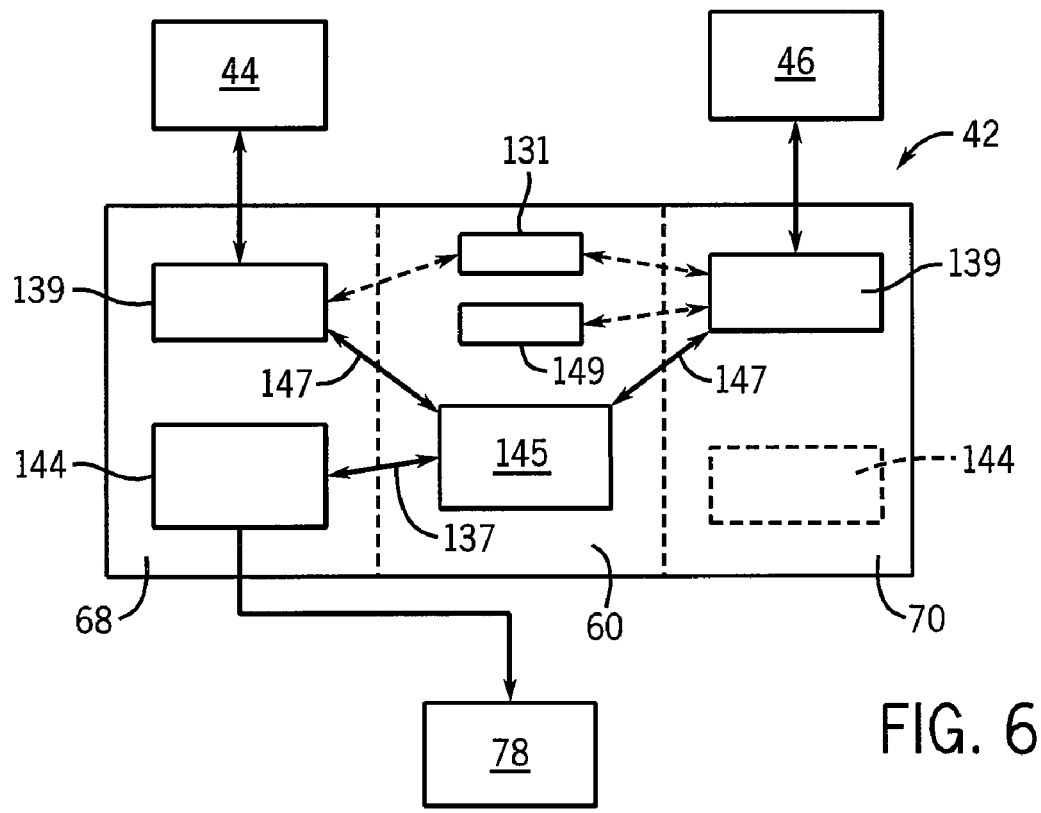
FIG. 6 is a block diagram of an implementation of common drivers in the present invention.

Referring now to FIG. 6, the present invention implements a common driver system that allows simultaneous access to a given piece of hardware 78, for example, a secure digital card or a serial port, by multiple cores 44 and 46 while allowing the responsibility of managing (executing) the driver to be freely shifted among cores, as may be required in a fault situation or for reasons of load management, and further permits each core 44, 46 to implement the driver in an arbitrary language or with different compilations of a common source.

Specifically, the exclusive memory spaces 68 and 70 for each core 44 and 46 may include driver allocation code 139 and driver code 144. The driver allocation code 139 handles the process of selecting a core 44 or 46 and communicating with that core for executing the driver code 144 as will be described.

The driver functionality is implemented by the driver code 144, in exclusive memory 68 or 70, and driver state data 145 in common memory 60. In operation, one core, for example core 44, will have ownership of the driver meaning it will execute that driver code 144, for example, on a periodic basis, as indicated by arrow 137, to read the driver state data 145 which holds data to be input to or output from the hardware 78. In this process, the driver code 144 communicates with the hardware 78.

The driver state data 145 may be provided by any registered core 44 or 46 so that each core 44, 46 may simultaneously and asynchronously communicate, as indicated by arrows 147, with the hardware 78 through this driver state data 145 in common memory 60.

At any time core 44 may close the driver and erase the driver state data 145 in common memory 60. At this time, any other core, for example core 46 may assume driver responsibilities using its code 144 and the driver state data 145.

Figure 7:
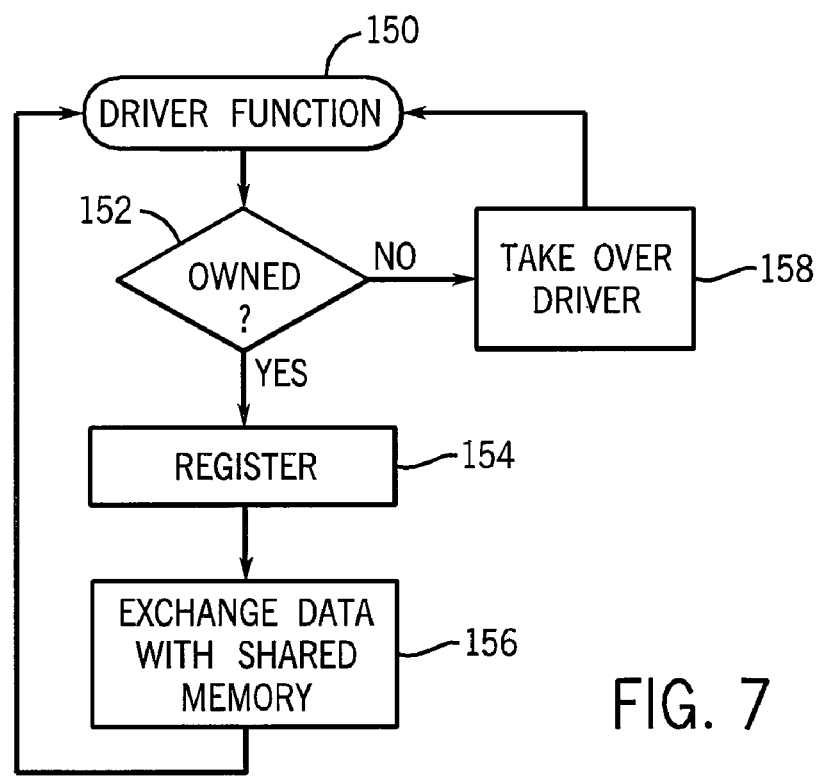
FIG. 7 is a flow chart showing the steps of using a common driver for hardware devices that cannot be used simultaneously by different applications.

Referring to FIGS. 6 and 7, when a given application program on one of cores 44 or 46 needs to execute a driver function, for example, making a write to or read from hardware 78, as indicated by process block 158, it uses the driver allocation code 139 in its memory space 70, as indicated by decision block 152, to determine whether the driver has been instantiated, that is, whether a core 44 or 46 has currently assumed responsibility for executing the driver. This may be determined by polling a common memory space 149 to see if ownership exists. Note that, particularly in a multicore processor with more than two cores, the core 46 requiring a driver function need not know the owner of the driver just whether it is owned.

If at process block 152, there is no owner, the core 46 executing driver allocation code 139, may take ownership of the driver by executing its code 144. This assumption of ownership entails two principal tasks. First, the driver code 144 begins execution to periodically poll the common memory space 145 to service data that needs to be read from or written to the hardware 78. Secondly, the driver allocation code 139 sets a flag in memory space 149 indicating the driver is owned and responds to requests for pointers to the common memory space 145 from other cores (e.g. core 44) in a process termed "registration" as will be described below with respect to core 46.

Assuming at process block 152, the driver is owned, then the driver allocation code 139 of core 46 may proceed to process block 154 and register with the owner of the driver. This registration identifies the driver type (e.g. the hardware 78) and an identifier for the core 46. At this point, the driver allocation code 139 of the owning core (e.g., core 46) responds with a pointer 131 via shared memory 60 pointing to driver state data 145 in common memory 60 and the use of the driver is then available as indicated by process block 156 through exchange of data with driver state data 145 in common memory space 60.

Referring again to FIGS. 5 and 2, in the event of power loss signaled, for example, by power line signal 92 from power processing circuit 88 (for example through an interrupt), the core 44 may undertake an orderly shutdown of the multicore processor 40. As represented by process block 160, core 44 begins by shutting down I/O activity, for example, by setting the I/O into a passive "wait for interrupt" state. At process block 162, those components which can operate in a low-power mode, for example, the memory 42 and the synchronization clock circuitry 76, are switched to that mode. Such modes for example may slow clock speeds or put certain circuitry into a sleep state.

At process block 164, critical data for core 46 held in portion 70 of memory 42 may then be copied to memory portion 68 by changing the settings on the MMU 62. This process can be accelerated by using a flag structure implemented by core 44 to indicate whether such data exists so as to avoid unnecessary copying. In this regard, core 44 need not understand the data considered by core 46 to be critical Upon conclusion of the saving of any critical data used by core 46, core 46 is shut down as indicated by process block 166 using the control line 128 provided in the architecture of this multicore processor 40.

At this point, as indicated by process block 168, core 44 saves its critical data identified for core 46 to the critical operation data 53. As indicated by process block 170, a completion flag is then set (which will indicate upon power up whether this process was quickly performed or a fault is indicated). The flag also indicates during the start type query of process block 116 the type of start, in this case indicating that a program was ongoing so that necessary program data must be restored during process block 124. If this flag is not set, then upon reboot, a fault condition is entered.

Finally at process block 172, core 44 shuts down itself using a software controllable self-reset circuit implemented in the power processing circuit 88. By minimizing power usage as quickly as possible, the power stores that may be obtained on board either through power capacitors or onboard batteries is prolonged sufficiently to allow preservation of data either in a power loss or a card removal situation.

Figure 8:
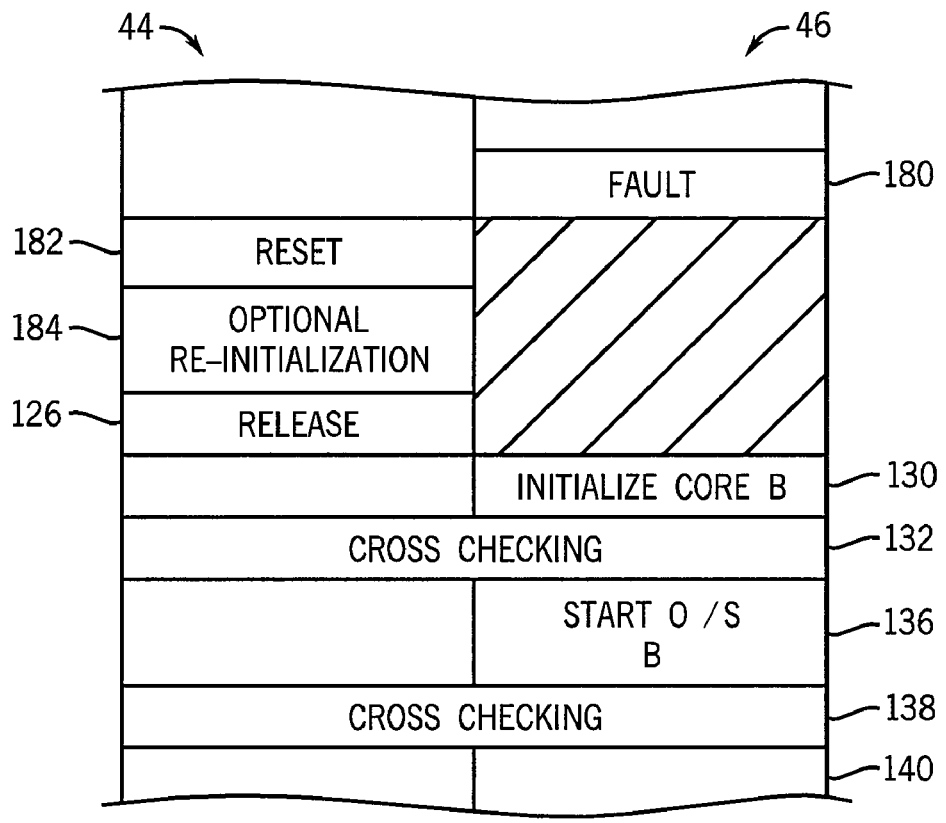
FIG. 8 is a figure similar to that of FIG. 5 showing the shutdown of one processor in response to a nonrecoverable fault condition without affecting the other processor.
Figure 9:
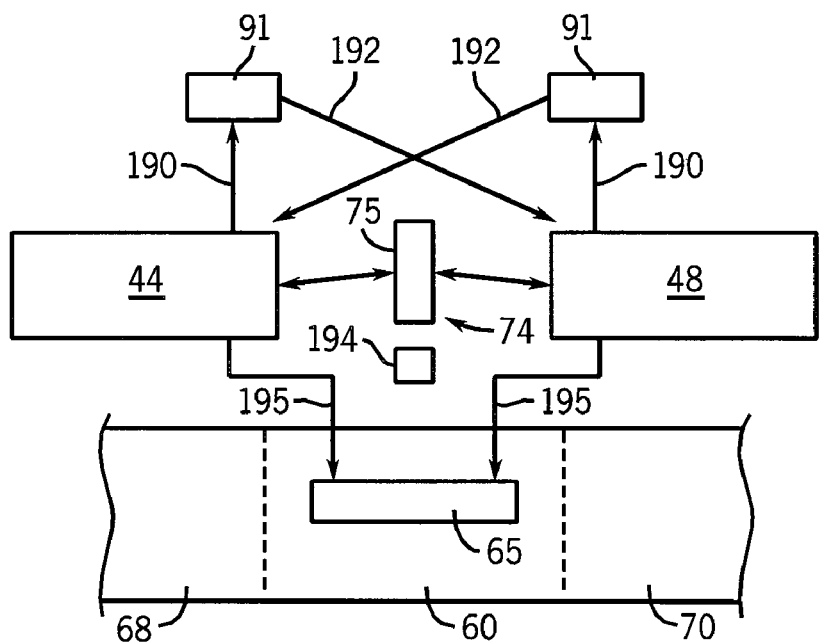
FIG. 9 is a block diagram of an interprocessor communication channel used for communication between the cores and cross-connected watchdog timers used for generating fault conditions.

Referring now to FIGS. 2, 8, 9, the architecture of the multicore processor 40 allows individual cores 44, 48, and 46 to throw unrecoverable faults without necessarily stopping the execution of the multicore processor 40 or the other core. As indicated by step 180 of FIG. 8, fault conditions for core 46 (typically detected by core 44 as will be described below) may throw an exception indicating that it is unrecoverable. This fault can be handled by causing the core 44 to initiate a reset of core 46 as indicated by process block 182. At process block 184 optional reinitialization may be performed including any of the steps of 120, 122, and 124 described above with respect to FIG. 5. Then at process block 126, core 46 may be released to restart according to process blocks 130-140 as have previously been described. It will be understood that core 44 may also reset itself while allowing core 46 to remain operating. A flag is set to be queried at process block 116 upon restart of core 44 to indicate this state. Referring to FIG. 9, one type of nonrecoverable fault handled by process block 180 of FIG. 8 can occur by an interrupt thrown by the watchdog timers 91. Each core 44 may periodically reload its own watchdog timer 91, as indicated by arrows 190, and read the watchdog timer 91 associated with (or accept software interrupts from) the other core 44, 48 as indicated by arrows 192. Overflow of a watchdog timer 91 caused by a failure of the associated core 44 or 46 to reload it, throws an interrupt to the other processor. Core 44 receiving this interrupt may reset core 46 using the reset line shown in FIG. 2. After such a resetting, core 44 initiates a restart of core 46 by repeating process blocks 124, 126 and allowing core 46 to reboot per process block 130 of FIG. 5 and the succeeding steps of core 46 as described above.

On the other hand, core 46 receiving this interrupt may provide an interrupt to core 44 via the interprocessor communication channel 75, which, depending on the severity of the fault, may permit core 44 to reset itself as described above.

The present invention provides for communication between cores 44 and 46 by means of an interprocessor communication channel 75 implemented through interrupt circuitry 74 by means of which each core 44 or 46 may interrupt the other through software interrupts causing the receiving core 46 or 44 to jump to a software vector per arrows 195 located in an interprocessor communication area 65 to receive data exchange in mutual memory portion 60. Multiple channels and multiple priorities are provided to allow time critical messaging to take precedence over lower priority interprocessor communications. The interrupt circuitry 74 may include at least one test-and-set interrupt register 194 that permits atomistic testing and setting to provide semaphore control for the coordination of applications on different cores 44 or 46. These semaphores, as is understood in the art, may be used for coordinating actions of the cores 44 and 46. A test and set instruction is non-interruptible and thus allows the implementation of a token or similar logical construct that may enforce an execution order by the cores 44 and 46 in a reliable fashion.

Figure 10:
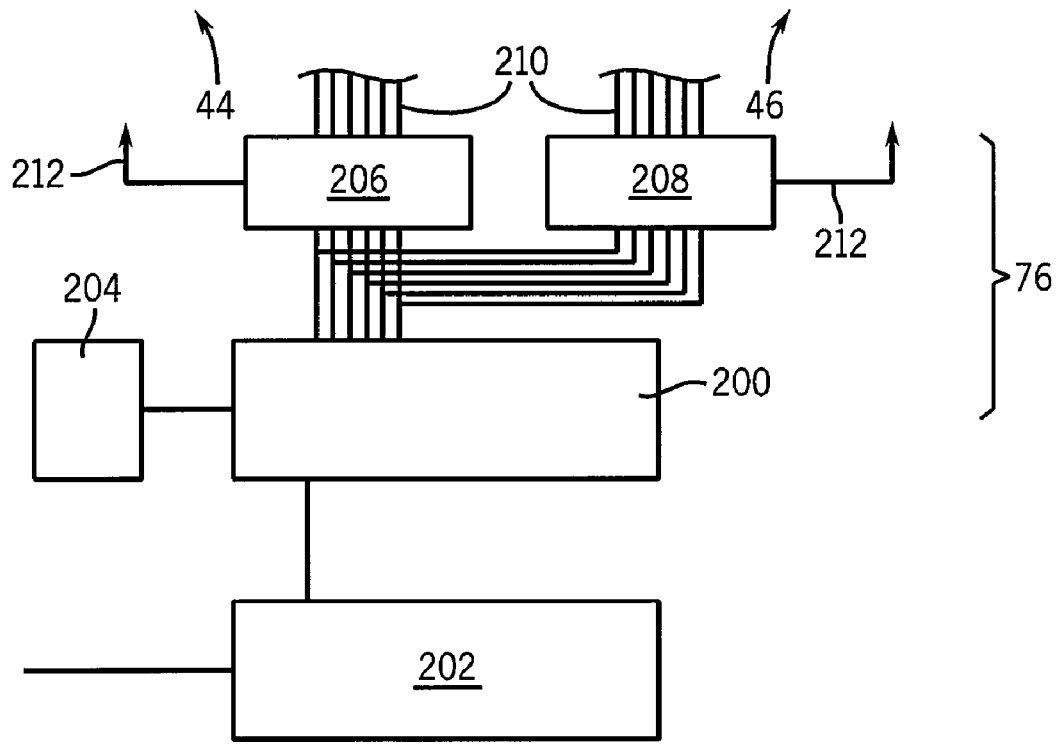
FIG. 10 is a detailed block diagram of an onboard accumulating counter for implementing a global clock using the IEEE 1558 standard.

Referring now to FIG. 10, the present architecture permits close integration with IEEE 1558 time synchronization standards in which a highly precise synchronization clock circuitry 76 (1 μs resolution) can be incorporated on chip. The synchronization clock circuitry 76 includes accumulating counter 200 which counts a clock signal from a clock generator 204. The absolute value of the counter 200 can be synchronized to a global clock in the industrial control system 10 using the 1558 standard implemented by network communications circuitry 202 of a type known in the art. Dedicated digital comparators 206 and 208 receive output from the counter 200 and may receive a trigger clock value over lines 210 from cores 46 and 44 respectively. Each comparator 206 and 208 may drive an interrupt line 212 to its respective core 44 or 46 when the trigger clock value matches the output of the counter 200. In this way high-speed reaction to globally synchronized events may be implemented at the on-chip level independently for the two cores but using a common timebase for its near perfect synchronization between activities of the cores 44 and 46.

Figure 11:
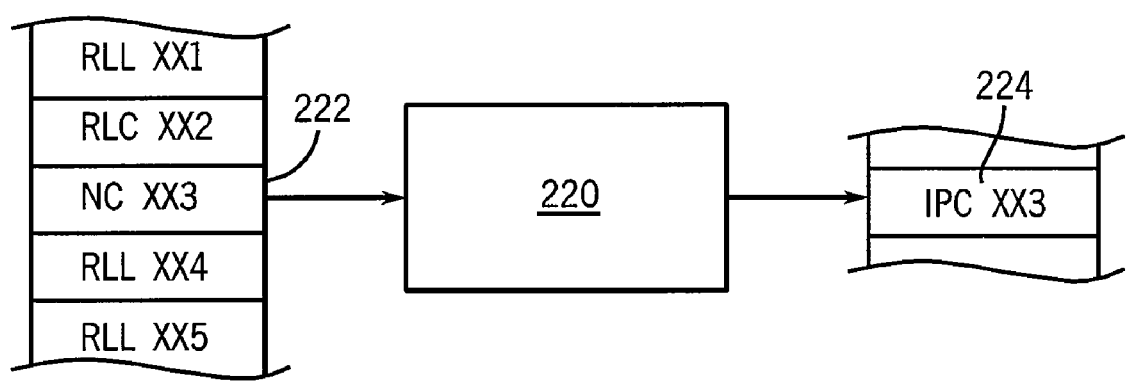
FIG. 11 is a flow chart of a microcode implementation for cores for reinterpretation of network instructions as instructions using the interprocessor communication channel of FIG. 9.

Referring now to FIG. 11, the present invention contemplates providing a simple migration path for programs written for separate processors where the processors communicate data between each other using standard network connections. Such network communications are not preferred in the present invention which provides for extremely closely coupled communication between the onboard cores 44 and 46 through the interprocessor communication channel 75 described above and shared memory. Nevertheless, often it will be desired to reuse programs written for an earlier architecture so as to save the substantial labor required for preparing new programs. Accordingly, each of the cores 44 and 46 may include a microcoder 220 working at the instruction level to detect network instructions 222 normally used to communicate between separate processors and convert them to instructions using the interprocessor communication channel 224. This instruction level remapping provides substantial performance gains when using standard industrial control languages in programs prepared for legacy devices.

It will be understood that although two general-purpose cores are described herein, the techniques described in the present application are not limited to two cores but may be applied to higher order multicore processors.

The present invention has been described in terms of the preferred embodiment, and it is recognized that equivalents, alternatives, and modifications, aside from those expressly stated, are possible and within the scope of the appending claims.

We claim:

1. An industrial controller comprising:
   a multicore electronic computer having a first and second processor, each processor having respective memory caches;
   a shared electronic memory communicating with the first and second processors through their memory caches, the electronic memory holding a first and second operating system;
   wherein the first processor includes a general-purpose core and a reduced instruction set computing (RISC) core, the RISC core having a reduced instruction set of industrial control instructions and
   wherein the second processor is a general-purpose core;

a startup sequence circuit responding to a startup signal to:
(a) assign industrial control programs for controlling a machine in real-time by reading input signals from sensors on the machine to provide output signals to actuators on the machine according to control logic to the first processor; and
(b) assign programs that may operate asynchronously to determine the value of the input and output variables to the second processor;
wherein the programs on the first and second processor may communicate by exchange of data using shared space in the electronic memory.

2. The industrial controller of claim 1 wherein programs on the second processor execute communication protocols for executing asynchronous networks.

3. The industrial controller of claim 2 wherein the communication protocols are selected from the group consisting of: Ethernet, DeviceNet and USB communication protocols.

4. The industrial controller of claim 1 wherein the startup sequence circuit assigns application programs to the first and second processors by controlling memory spaces of the processors and controlling a placing of application programs in those memory spaces.

5. The industrial controller of claim 1 wherein the startup sequence circuit limits the second processor from modifying its memory access and interrupts.

6. The industrial controller of claim 1 wherein the startup sequence circuit holds the second processor in reset during and initialization of the multicore electronic computer by the first processor executing a startup program.

7. The industrial controller of claim 1 wherein the first processor may provide signals to the second processor according to an executed application program on the first processor, the signals shutting down the second processor.

8. The industrial controller of claim 7 further including a power backup system providing a signal to the first processor indicating use of backup power and triggering an application program on the first processor to shut down the second processor.

9. The industrial controller of claim 1 wherein the first processor may exclusively control reset and run lines of the second processor core, the memory management unit of the second processor and allocation of interrupts between the first and second processors.

10. The industrial controller of claim 1 wherein wherein the electronic memory includes a portion dedicated to I/O data exchanged between the industrial controller and a controlled process, the multicore processor further including:
a cache manager circuit routing access of the data of the portion by the general-purpose core of the first processor through the memory cache of the RISC core, whereby invalidation of the cache of the RISC core is minimized.

11. The industrial controller of claim 1 wherein the first and second processors use different operating systems.

12. The industrial controller of claim 1 further including a system clock providing for a first and second comparator receiving a time value and receiving from the first processor and second processor, respectively, a time trigger value for providing a triggering signal to the first and second processor based on the time value.

13. The industrial controller of claim 12 wherein the system clock is synchronized to clocks on a network in remote devices.

14. The industrial controller of claim 12 wherein the programs on the second processor execute communication protocols for executing asynchronous networks and the communication protocols implement IEEE 1558 time synchronization.

15. An industrial controller comprising:
at least one processor that includes a general-purpose core and a reduced instruction set computing (RISC) core core, the latter having a reduced instruction set of industrial control instructions, each core having respective memory caches communicating with a shared memory;
a memory shared by the general-purpose core and the RISC core and holding a control program for controlling a machine in real-time by reading input signals from sensors on the machine to provide output signals to actuators on the machine according to control logic, the memory further providing a portion holding I/O data exchanged between the industrial controller and a controlled process;
wherein the processor further includes a cache manager circuit routing access of I/O data by the general-purpose core through the memory cache of the RISC core, whereby invalidation of the cache of the RISC core is minimized.

16. The industrial controller of claim 15 wherein the processor executes a real-time operating system held in the memory.

17. The industrial controller of claim 15 further including a second processor not providing a RISC core and communicating with the memory through a cache of the second processor.

18. The industrial controller of claim 17 further including a system clock providing for a first and second comparator receiving a time value and receiving from the first processor and second processor respectively a time trigger value for providing a triggering signal to the first and second processor based on the time value.

19. The industrial controller of claim 18 wherein the system clock is synchronized to clocks in remote devices separated on a network.

20. The industrial controller of claim 19 wherein the programs on the second processor execute communication protocols for executing asynchronous networks and the communication protocols implement IEEE 1558 time synchronization.

* * * * *